United States Patent [19]

Begley

[11] Patent Number: 5,076,455
[45] Date of Patent: Dec. 31, 1991

[54] INTEGRAL HINGE FOR ELECTRICAL EQUIPMENT ENCLOSURES

[75] Inventor: Paul V. Begley, Earlysville, Va.

[73] Assignee: Coopoer Industries, Inc., Houston, Tex.

[21] Appl. No.: 685,112

[22] Filed: Apr. 15, 1991

[51] Int. Cl.⁵ .............................................. H02G 3/08
[52] U.S. Cl. .................................... 220/3.8; 220/335; 220/337; 220/338
[58] Field of Search ................. 220/3.8, 242, 337, 338, 220/341, 342, 252, 263; 16/386

[56] References Cited

U.S. PATENT DOCUMENTS

| 2,145,143 | 1/1939 | Trecartin | 220/337 X |
| 2,277,618 | 3/1942 | Utter | 220/3.8 X |
| 2,330,975 | 10/1943 | Jackson | 220/3.8 |
| 3,243,838 | 4/1966 | Blumberg | 220/338 X |
| 3,955,709 | 5/1976 | Coley et al. | 220/3.8 X |
| 4,819,828 | 4/1989 | Mirabel | 220/337 X |
| 4,821,899 | 4/1989 | Nycz et al. | 220/338 X |

FOREIGN PATENT DOCUMENTS 11664 11/1924 Netherlands ......................... 220/3.8

Primary Examiner—Stephen Marcus
Assistant Examiner—Paul Schwarz
Attorney, Agent, or Firm—Nelson Blish; Alan R. Thiele; Bruce Patterson

[57] ABSTRACT

An electrical equipment enclosure (10) with an improved hinge pivot (12). Enclosure (10) has a box (20) having emboss (22) and hood (40) having embossment (44). The embosses forming a hinge pivot for slot (34).

5 Claims, 4 Drawing Sheets

INTEGRAL HINGE FOR ELECTRICAL EQUIPMENT ENCLOSURES

BACKGROUND OF THE INVENTION

This invention relates to electrical equipment enclosures in general, and in particular to an improved hinge for a rainproof electrical equipment enclosure.

Electrical equipment enclosures of the type to which this invention relates are made of sheet metal or heavy duty plastic or other materials and are usually designed to be mounted on walls or other vertical surfaces. They are intended to protect electrical equipment such as circuit breakers or switches from rain as well as protect people from the hazardous voltages on the equipment. This type of equipment enclosure typically consists of two main parts, a box assembly and a cover. The box assembly usually consists of two pieces rigidly fastened together, but may be formed from a single sheet of metal as described in U.S. Pat. No. 4,851,963. The top wall of this assembly is often referred to as the hood as it shields the enclosure from the entry of rain. The cover is hinged at the top, under the hood, and is lifted to permit access to the equipment within the enclosure.

The cover hinge mechanism often uses a pin that protrudes through one side of the box and the cover flange and a second pin that protrudes through the other side of the box and the cover. This arrangement has not been completely satisfactory since it requires a separate component, thus increasing the cost of materials and the man-hours required to assemble the enclosure.

Attempts have been made to eliminate the pin, for example, by punching a three sided hole in the box and folding the flap over to engage a matching hole in the cover flange. There were some problems with this arrangement because of tolerance of the parts in mass produced enclosures and because of difficulty in assembling the box and the cover at the factory.

Another attempt was to eliminate the pin and to punch an embossment or bump in the box or hood, again matching up with a hole in the cover flange. This was easier to assemble, but there were still problems with tolerances. If the tolerances were too close there would be binding; if the tolerances were too loose the cover would fall off.

BRIEF SUMMARY OF THE INVENTION

An electrical equipment enclosure according to the present invention has a box with a hood attached wherein an embossment is punched outward from the box matching an embossment punched inward from the hood. These two embossments meet and form a hinge pivot, one hinge pivot on each side of the box, that matches with holes in the flanges of the cover. The cover has a locator notch at the top end of each flange for aligning both sides of the cover to the hinge pivots and slots designed to receive the hinge pivots.

DETAILED DESCRIPTION OF THE DRAWINGS

Figure 1:
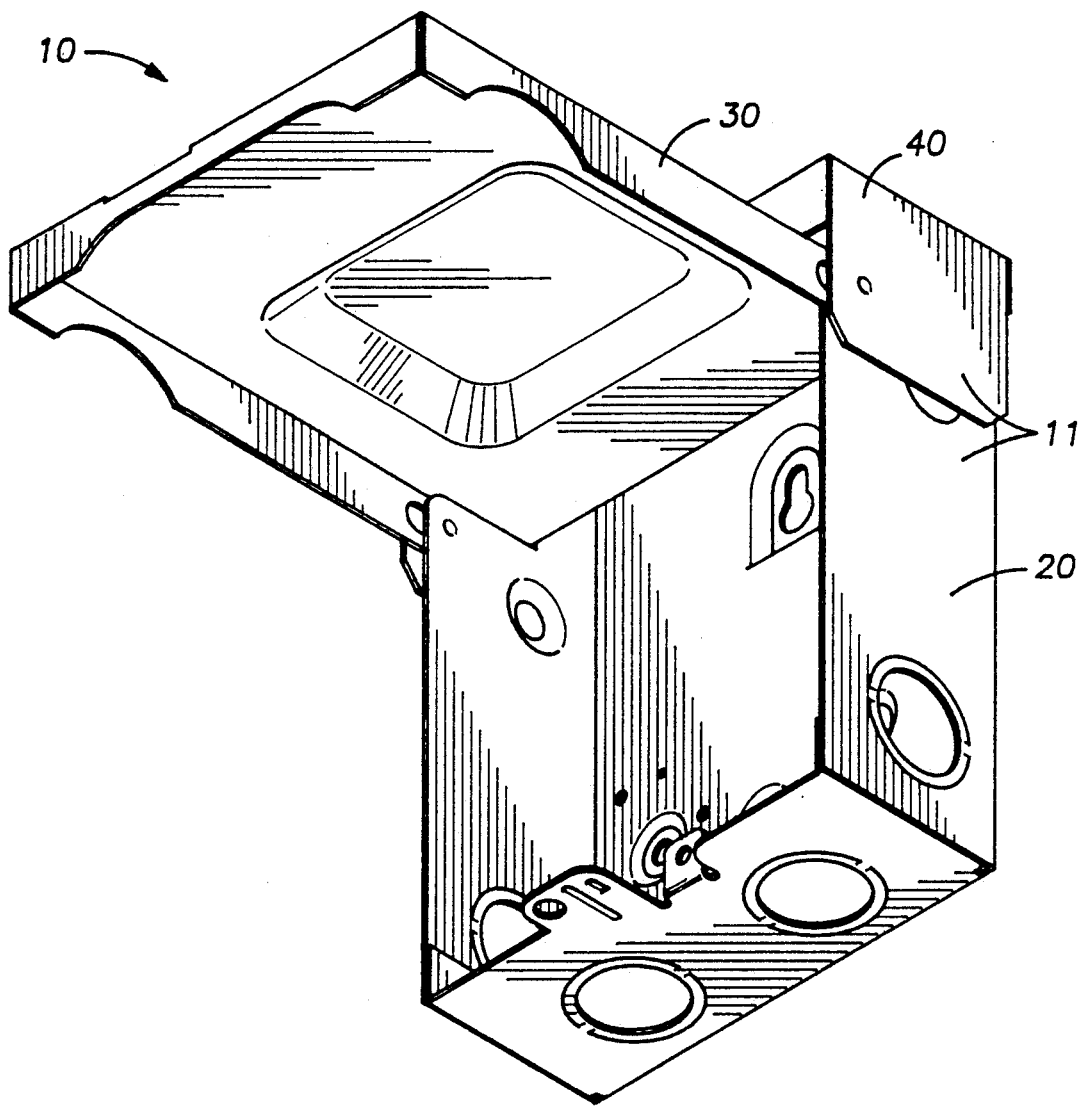
FIG. 1 shows a perspective view of an electrical equipment enclosure according to the present invention.
Figure 2:
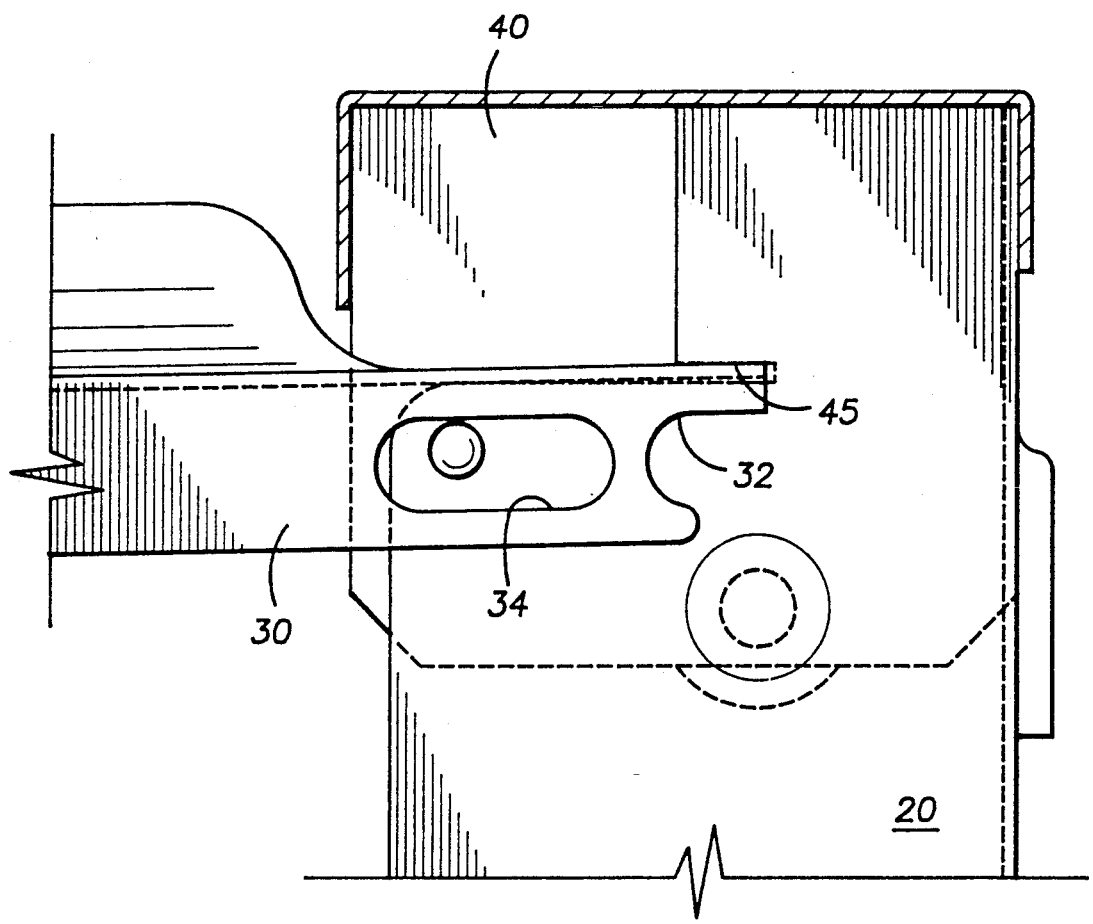
FIG. 2 shows a detailed view, partially in phantom, of the electrical equipment enclosure shown in FIG. 1, with the cover open.

Referring now to the drawings and in particular to FIG. 1, an electrical equipment enclosure is shown and referred to in general by numeral 10. Enclosure 10 is comprised of three parts: box 20, cover 30, and hood 40.

Figure 4:
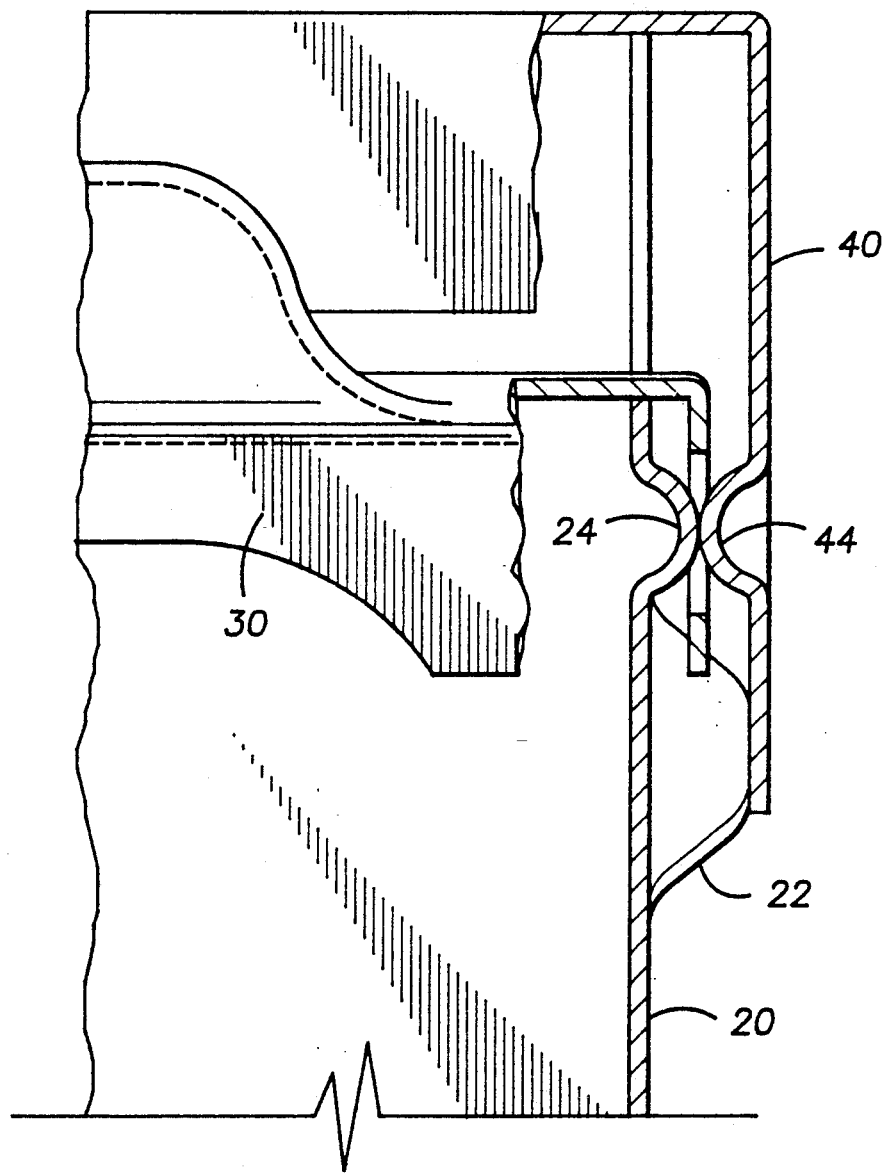
FIG. 4 shows a sectional view of the hinge portion of said electrical equipment enclosure.

Hood 40 is attached to box 20 by welding, riveting, or other methods known in the art. Hood 40 is constructed so that it is wider than box 20 providing a gap for cover 30. A spacing embossment 22 shown in FIG. 4, in the side of box 20, maintains proper spacing between the sides of hood 40 and box 20. Hood 40 is preferably welded or otherwise fastened to spacing embossment 22 for additional strength.

A small embossment or bump 24 is placed on each side of box 20. A matching embossment 44 is placed on each side of hood 40 so that emboss 44 and embossment 22 approximately touch. Embossments 24 and 44 form a hinge pivot 12 and there is one hinge pivot on each side of box 20.

Figure 3:
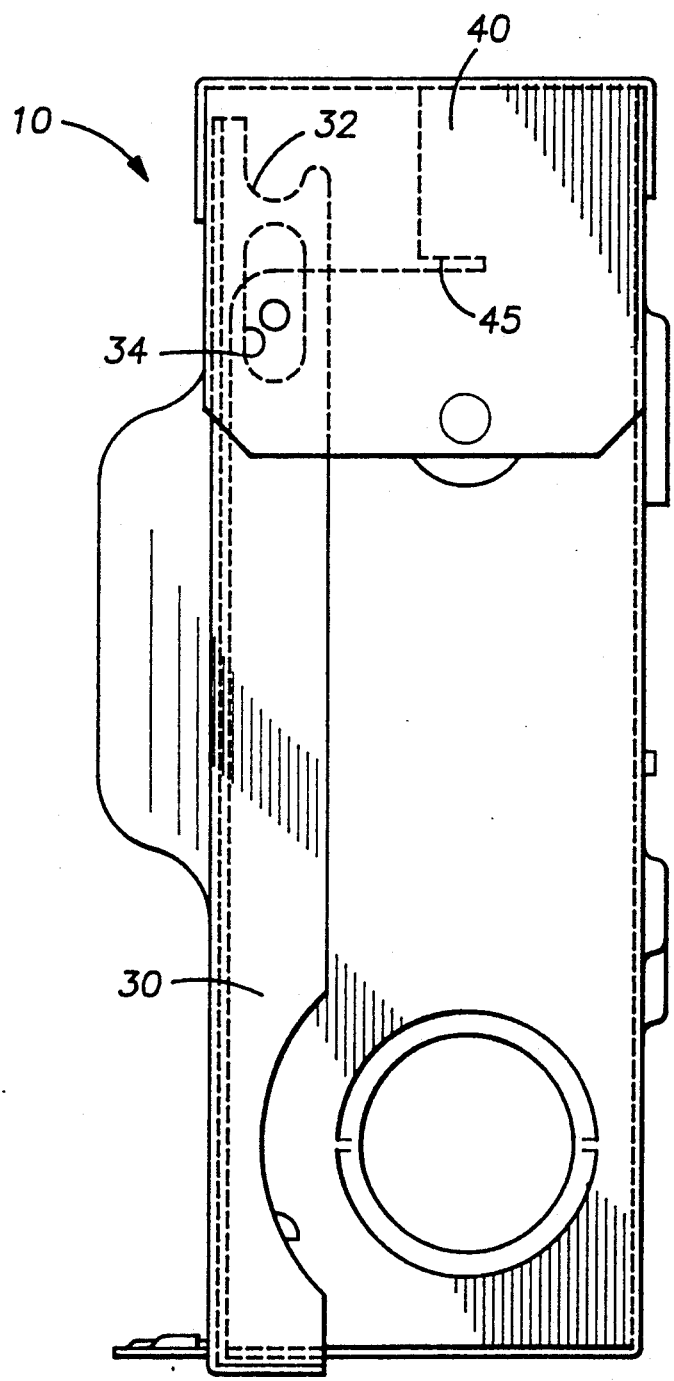
FIG. 3 shows a side view, partially in phantom, of the electrical equipment enclosure shown in FIG. 1 with the cover closed.

Cover 30 has a notch 32 and a slot 34 on each side shown in FIG. 3. The notch in the preferred embodiment is semi-circular so that during assembly as cover 30 is placed perpendicular to box 20, notch 32 rests centered on embossments 24 and 44.

When enclosure 10 is assembled, cover 30 is placed with notches 32 resting on hinge pivots 12. A sharp tap with the hand or a hammer causes the sides of box 20 and hood 40 to flex outward allowing cover 30 to slide downward so that hinge pivots 12 engage the slots 34. Having embossed areas on both hood 40 and box 20 reduces the distance that either must flex in order to accommodate cover 30.

Box side walls include slots 45 oriented approximately horizontal as shown in FIG. 3. When raised to the open position the cover can be pushed back into these slots if the holes in the cover flanges are elongated slots. The cover will remain conveniently propped open.

I claim:

1. An electrical equipment enclosure comprising a box;
   a hood attached to said box wherein said hood is wider than said box so that a gap exists between the sides of said hood and said box on either side;
   an embossment on each side of said box oriented outward;
   an embossment on each side of said hood oriented inward approximately aligned with said box embossments wherein said box embossments and said hood embossments form hinge pivots; and
   a cover having flanges and openings in said flanges adapted to receive said hinge pivots.

2. An enclosure as in claim 1 wherein a spacing embossment is located between said box side, and said hood side.

3. An enclosure as in claim 2 wherein said spacing embossment is fastened to said hood.

4. An enclosure as in claim 1 wherein said cover has notches on the ends of said flanges for aligning said cover with said hinge, pivots during assembly at said cover to said enclosure.

5. An enclosure as in claim 1 wherein said openings are elongated to allow said cover to engage a slot in at least one of the side walls of said box so that the cover may be supported in the open position.

* * * * *